(12) United States Patent
Chen et al.

(10) Patent No.: US 10,099,570 B2
(45) Date of Patent: *Oct. 16, 2018

(54) METHOD AND APPARATUS FOR IDENTIFYING BATTERY PACK TYPES

(71) Applicant: Ford Global Technologies, LLC, Dearborn, MI (US)

(72) Inventors: Elaine Y. Chen, Dearborn, MI (US); Deborah E. Callicoat, Livonia, MI (US); Robert Bolduc, Northville, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/250,372

(22) Filed: Aug. 29, 2016

(65) Prior Publication Data

US 2016/0362017 A1    Dec. 15, 2016

Related U.S. Application Data

(63) Continuation of application No. 14/508,691, filed on Oct. 7, 2014, now Pat. No. 9,446,680.

(51) Int. Cl.
 *B60L 11/18* (2006.01)
 *B60R 16/023* (2006.01)
 *H02J 7/00* (2006.01)

(52) U.S. Cl.
 CPC ...... *B60L 11/1864* (2013.01); *B60R 16/0231* (2013.01); *H02J 7/0009* (2013.01); *Y02T 10/7011* (2013.01); *Y02T 10/7016* (2013.01); *Y02T 10/7061* (2013.01); *Y10S 903/907* (2013.01)

(58) Field of Classification Search
 CPC ... B60L 11/1864; H01M 2/342; H02J 7/0086; B60D 1/26; G06F 1/266; B25F 5/021; G01R 31/31831
 See application file for complete search history.

(56) References Cited

U.S. PATENT DOCUMENTS

| | | |
|---|---|---|
| 5,651,821 A | 7/1997 | Uchida |
| 6,285,158 B1 | 9/2001 | Higuchi |
| 2004/0189245 A1* | 9/2004 | Teraoka ............... H01M 2/342 320/107 |

(Continued)

FOREIGN PATENT DOCUMENTS

EP    0394074 A2    10/1990

*Primary Examiner* — Yuri Kan
(74) *Attorney, Agent, or Firm* — James P. Muraff; Neal, Gerber & Eisenberg LLP

(57) ABSTRACT

A method, apparatus, and system are disclosed for analyzing a vehicle battery system of a hybrid or electric vehicle that includes a battery pack and a battery controller. More specifically, a battery controller is disclosed for determining battery identification information of the battery pack based on a configuration of active and non-active pins in a connection module between the battery pack and the battery controller. It follows that the battery controller may identify the battery pack type in an efficient manner that does not require any additional components. The battery controller may further reference the battery identification to implement a battery operational strategy that may better realize an efficiency or durability of the identified battery.

22 Claims, 6 Drawing Sheets

(56) References Cited

U.S. PATENT DOCUMENTS

| | | |
|---|---|---|
| 2007/0075685 A1 | 4/2007 | Aradachi et al. |
| 2008/0263486 A1* | 10/2008 | Alexanian ...... G01R 31/318314 716/106 |
| 2010/0156342 A1 | 6/2010 | Hrabal |
| 2011/0248669 A1* | 10/2011 | Cunanan ................. B25F 5/021 320/106 |
| 2012/0306452 A1 | 12/2012 | Christensen et al. |
| 2014/0078116 A1* | 3/2014 | Mercea ................... G06F 1/266 345/179 |
| 2014/0232326 A1 | 8/2014 | Wohltmann et al. |
| 2014/0240966 A1* | 8/2014 | Garcia ................. H02J 7/0086 362/183 |

* cited by examiner

500

| Arrangement of Pin Positions for 12 Pin Location Connection Module | Battery Identification Information |
|---|---|
|  501 | Lithium-ion from Supplier A 502 |
|  503 | Lithium-ion from Supplier B 504 |
|  505 | Lithium-ion from Supplier B with increased capacity 506 |
| . . . | . . . |

METHOD AND APPARATUS FOR IDENTIFYING BATTERY PACK TYPES

PRIORITY CLAIM

This application is a continuation of U.S. patent application Ser. No. 14/508,691, filed on Oct. 7, 2014 and published as U.S. Publication No. 2016/0096444 on Apr. 7, 2016. The prior application and the prior publication are both hereby incorporated by reference in their entireties.

TECHNICAL FIELD

This disclosure generally relates to a method and apparatus for analyzing a vehicle battery system for a hybrid or electric vehicle that includes a battery pack and a battery controller. More specifically, the disclosure describes a method and system for the battery controller to detect a type of battery cell within the battery pack based on a configuration of active and non-active pins in a connection module used for transmitting battery sensor signals between the battery pack and the battery controller. It follows that the battery controller may determine the battery cell type in an efficient manner that does not require any additional components.

BACKGROUND

Vehicles powered, at least in part, by a vehicle battery (e.g., hybrid vehicle or electric vehicle) are becoming more prevalent for their ability to reduce dependence on combustible fuel sources. As vehicle battery technology progresses, different types of vehicle batteries that utilize different types of battery cells have been developed to each have their own unique attributes. Although the diversity of available vehicle battery types offers a wider range of different capabilities and characteristics that may be suited for a wider range of environments and uses, it also follows that different battery cell types may require specialized operational control in order to maximize the efficiency and durability of the overall vehicle battery.

However, it may be difficult to identify the type of battery cell inside of a vehicle battery without opening up the battery pack as the external characteristics of different batteries may be similar, if not the same. Thus there exists the risk of not being able to confirm with certainty the types of battery cells being utilized by a vehicle battery without physically opening the vehicle battery.

SUMMARY

A system, apparatus, and method are disclosed capable of identifying a type of battery cell being used within a battery pack without having to physically open up the battery pack for confirmation. Accordingly, the vehicle may accurately select and implement the operating procedure intended to optimize the operation of the specific battery cell type within the vehicle battery.

Exemplary embodiments provide a vehicle battery system comprised of a battery pack including one or more battery cells, a battery controller, and a method for operating the vehicle battery system. The battery controller may be configured to receive a battery sensor signal from the battery pack that tracks an attribute of battery cells that are within the battery pack. The battery sensor signal may be received through a connection module that includes a plurality of pin positions.

According to some embodiments of the invention disclosed herein, the battery controller may be configured to receive the battery sensor signal through the connection module at a connection interface of the battery controller, detect an arrangement of active and/or non-active pin positions on the connection module based on an analysis of the battery sensor signal, and determine a battery cell type based on the arrangement of active and/or non-active pin positions on the connection module. The battery cell type may correspond to a type of battery cell, a number of battery cells, make of the battery, model of the battery, manufacturer/supplier of the battery, and/or other information corresponding to an attribute of one or more battery cells that comprise the battery pack.

According to some embodiments of the invention described herein, a computing device of a vehicle battery system is provided. The computing device may comprise a connection interface configured to receive a connection module and a processor in communication with the connection interface. The processor may be configured to: receive a sensor information signal from the connection module via the connection interface; determine active pin positions of the connection module based on the sensor information signal; and determine battery identification based on an analysis of the active pin positions.

According to some embodiments of the invention described herein, a method for identifying a battery cell type of a battery pack system is further provided. The method may comprise receiving, at a processor, a sensor information signal received from a connection module via a connection interface; determining, by the processor, active pin positions of the connection module based on the sensor information signal; and determining, by the processor, battery identification based on an analysis of the active pin positions.

According to some embodiments of the invention described herein, a battery pack system is further provided. The battery pack system may be comprised of a battery pack comprised of a plurality of battery cells; a connection module including a first number of active pins in communication with one or more battery cells and a second number of non-active pins not in communication with the battery cells; and a computing device configured to determine battery identification based on an attribute of the connection module.

These and various other embodiments and aspects will become apparent and be more fully understood from the following detailed description and accompanying drawings, which set forth the illustrative embodiments that are indicative of the various ways in which the principles of the invention may be employed.

This application is defined by the appended claims. The description summarizes aspects of the embodiments and should not be used to limit the claims. Other implementations are contemplated in accordance with the techniques described herein, as will be apparent upon examination of the following drawings and detailed description, and such implementations are intended to be within the scope of this application.

BRIEF DESCRIPTION OF THE DRAWINGS

For a better understanding of the invention, reference may be made to embodiments shown in the following drawings. The components in the drawings are not necessarily to scale and related elements may be omitted so as to emphasize and clearly illustrate the novel features described herein. In addition, system components can be variously arranged, as known in the art. In the figures, like referenced numerals may refer to like parts throughout the different figures unless otherwise specified.

FIG. 1 illustrates an exemplary vehicle battery system, according to some embodiments.

DETAILED DESCRIPTION OF EXAMPLE EMBODIMENTS

Figure 1:
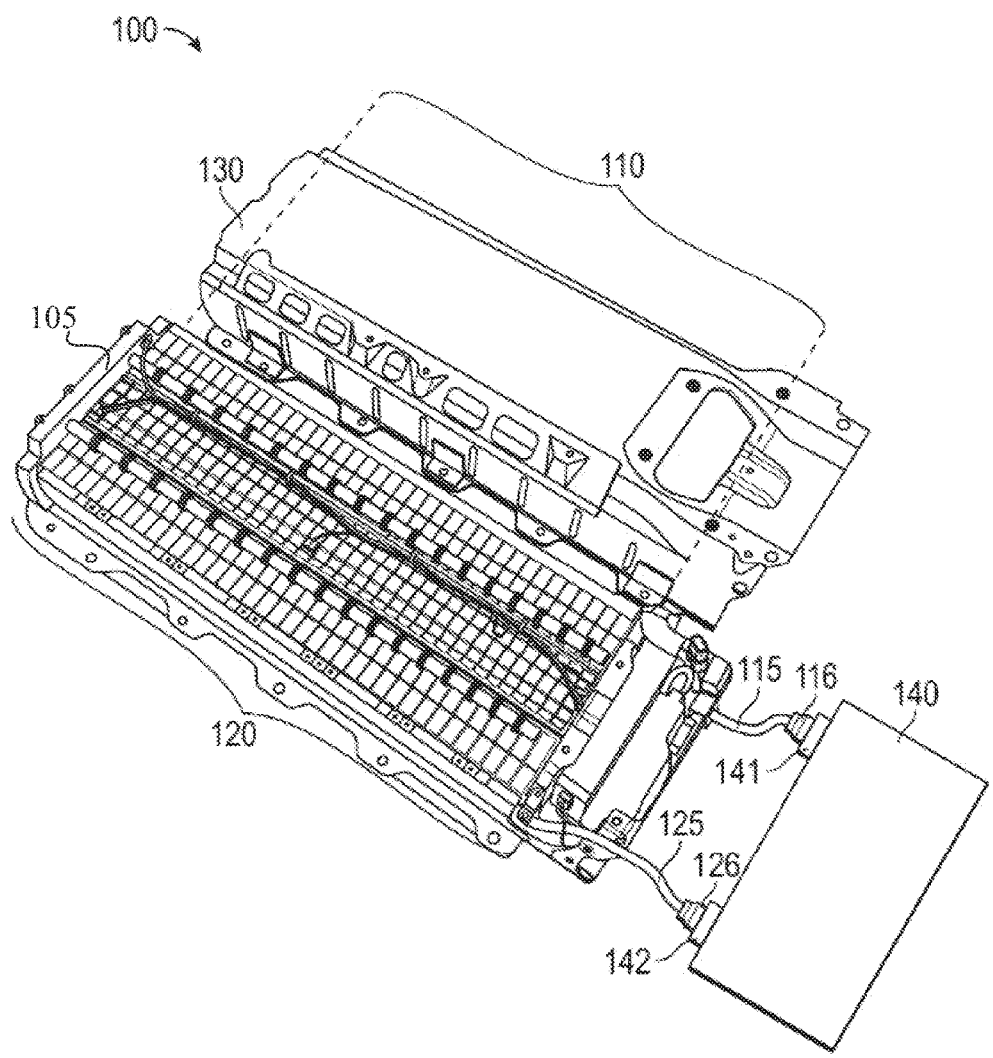

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated. Not all of the depicted components described in this disclosure may be required, however, and some implementations may include additional, different, or fewer components from those expressly described in this disclosure. Variations in the arrangement and type of the components may be made without departing from the spirit or scope of the claims as set forth herein.

An electric or hybrid vehicle may utilize a dedicated vehicle battery to power, at least in part, the propulsion of the vehicle. This dedicated vehicle battery may, for example, be a lead-acid technology based battery, Nickel-metal hydride technology based battery, Lithium-ion technology based battery, or other type of battery known to be capable of powering, at least in part, the propulsion of a vehicle. Although each of the different battery types that may be utilized in an electric or hybrid vehicle share the same goal of providing the power to propel the vehicle, each different battery type will also have its own unique attributes. A vehicle battery type may be distinguished according to the type of battery cell that comprises the battery. For example, a Nickel-metal hydride battery may have unique attributes from a Lithium-ion battery.

Further, even within a same battery type, batteries produced by different manufacturers/suppliers may have their own unique attributes. For example, a Lithium-ion battery manufactured by supplier A may have different attributes from a Lithium-ion battery manufactured by supplier B. It follows that the efficiency and/or durability of operating a particular type of battery may be realized by implementing an operation procedure that has been developed to specifically account for the battery type. In addition or alternatively, the efficiency and/or durability of operating a particular type of battery may be realized by implementing an operation procedure that has been developed to specifically account for the make, model, and/or manufacturer/supplier of the battery.

This disclosure therefore describes a vehicle battery system for use in an electric or hybrid vehicle. The vehicle battery system may be comprised of a battery pack that includes one or more battery cells and a battery controller. The vehicle battery system may further include a connecting portion comprised of one or more connecting wires and a connection module that includes a plurality of pin locations in a known arrangement. One or more of the connecting wires may be in communication (e.g., direct, or indirect contact) with one or more of the battery cells that comprise the battery pack in order to sense a characteristic of the battery cells. For example, the connecting wires may sense a temperature or voltage characteristic of the battery cell the connecting wire is in communication with. A battery sensor signal may then be generated based on the sensed characteristic of the battery cells, and transmitted to the battery controller through the connection module. The connection module may include a first number of pins corresponding to the connecting wires (i.e., active pins), as well as a second number of pins that are not connected to any of the connecting wires (i.e., empty, or non-active pins). The connection module may further arrange pins in a known arrangement at specified positions and/or having a specified number of pins. The battery controller may receive the battery sensor signal from the connecting module through a connection with an interface of the battery controller. A battery identification strategy being executed by the battery controller may comprise the battery controller receiving the battery sensor signal and being configured to analyze the received battery sensor signal in order to determine a battery cell type that is included in the battery pack. In addition or alternatively, the battery controller may receive the battery sensor signal and be configured to analyze the received battery sensor signal in order to determine a battery make, model, and/or battery manufacturer/supplier in accordance with a battery identification strategy. Further description of the vehicle battery system, and the operational procedures implemented by the vehicle battery system, is provided in further detail throughout this disclosure.

The battery identification strategy being executed by the battery controller may be a program, application, and/or some combination of software and hardware that is incorporated on one or more of the components that comprise the vehicle's battery system. Further description for the battery identification strategy and the components of the vehicle system executing the battery identification strategy is described in more detail below.

FIG. 1 illustrates an exemplary vehicle battery system 100 according to some embodiments. The vehicle battery system 100 may be comprised of a battery pack 105, battery controller 140, a first connector 115, and a second connector 125.

FIG. 1 further illustrates a battery pack cover 130 that has been taken off the battery pack 105 in order to offer a view of the battery cells that comprise the inside workings of the battery pack 105. For example, it can be seen that the battery pack 105 includes at least a first array 110 and a second array 120 of battery cells. Although FIG. 1 illustrates the battery pack 105 as being comprised of the first array 110 and the second array 120 of battery cells, it is within the scope of the present disclosure for the battery pack 105 to include one or more arrays of one or more battery cells. It should be noted that the battery cells comprising the battery pack 105 may be of a type corresponding to one of lead-acid technology, Nickel-metal hydride technology, Lithium-ion technology, or other known types of vehicle battery technology.

The first connector 115 is illustrated as being comprised of a wire connector portion in communication with one or more battery cells within the first array 110 on one end, and a first connection module 116 on the other end. Similarly, the second connector 125 is illustrated as being comprised of a wire connector portion in communication with one or more battery cells within the second array 120 on one end, and a second connection module 126 on the other end.

The battery controller 140 is illustrated as including a first connection interface 141 and a second connection interface 142 for receiving the first connection module 116 and the second connection module 126 of the first connector 115 and second connector 125, respectively. In other words, the first connection interface 141 and the second connection interface 142 of the battery controller 140 are configured to connect to the first connection module 116 and the second connection module 126, respectively, in order to allow the battery controller 140 to receive a battery sensor signal from the battery pack 105. For example, the first connection module 116 and second connection module 126 may be a female-type plug including a plurality of receptive pin positions arranged in a known arrangement. It follows that the first connection interface 141 and second connection interface 142 of the battery controller 140 may be of a male-type connector in order to receive the female-type first connection module 116 and second connection module 126, respectively. It is also within the scope of the vehicle battery system 100 described herein for the first connection module 116 and second connection module 126 to conversely be of the male-type plug connection and the first connection interface 141 and second connection interface 142 of the battery controller 140 to be of the female-type plug connection.

Figure 2:
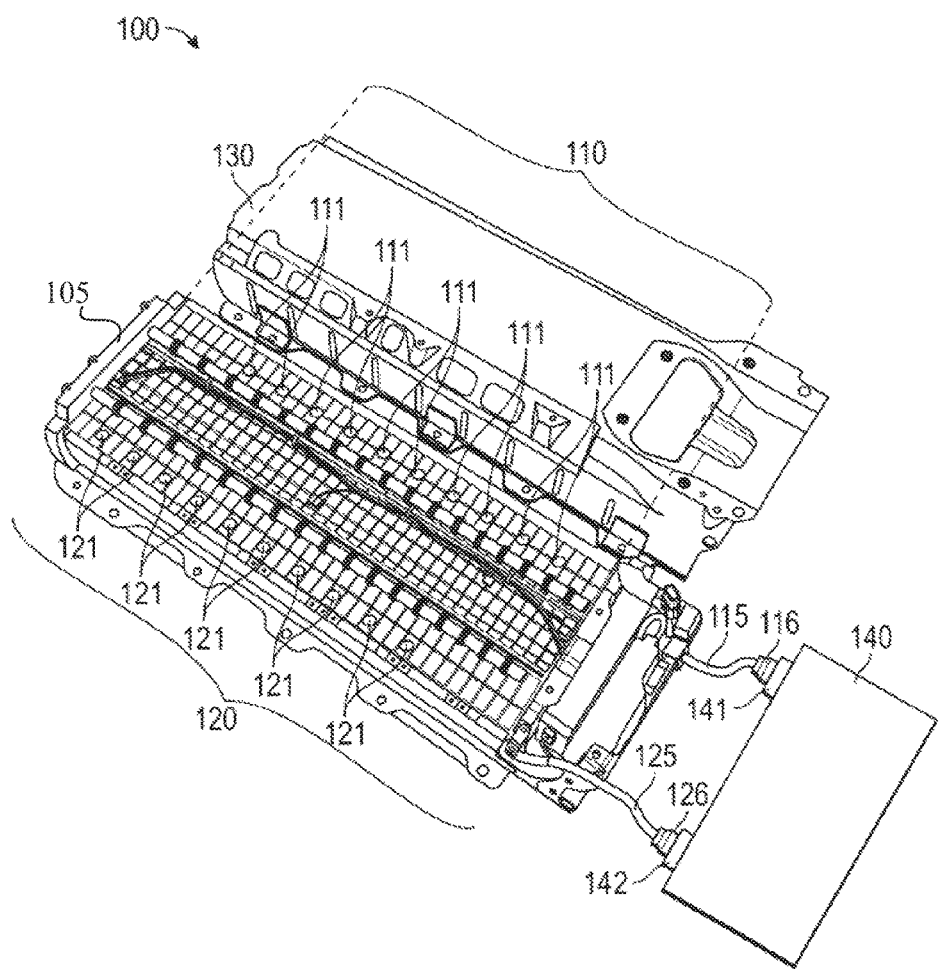
FIG. 2 illustrates an exemplary vehicle battery system including, according to some embodiments.
Figure 3:
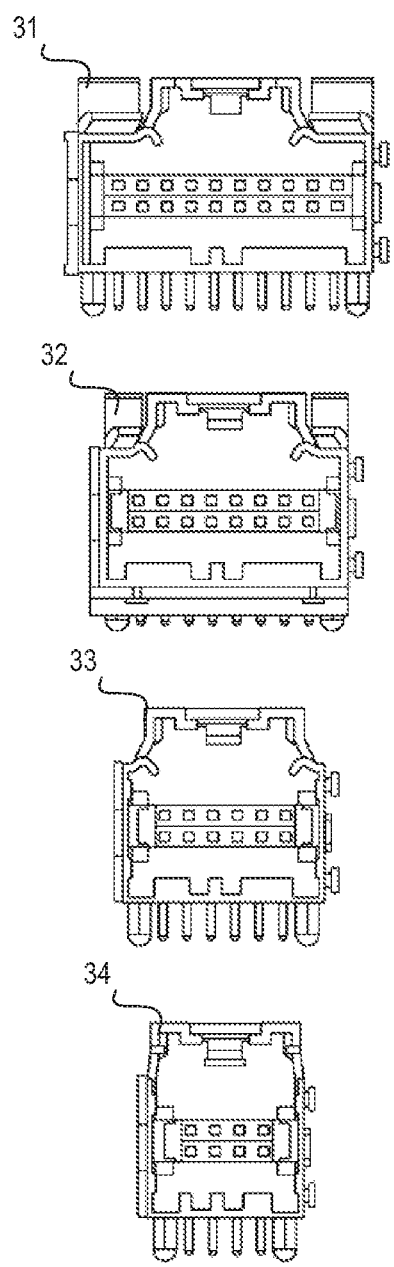
FIG. 3 illustrates exemplary connection modules, according to some embodiments.

FIG. 3 illustrates a number of exemplary connection modules including a 20-pin arrangement 31, a 16-pin arrangement 32, a 12-pin arrangement 33, and an 8-pin arrangement 34. The number of pins and arrangements illustrated in FIG. 3 are provided for exemplary purposes only, as a greater, or fewer, number of pins, as well as other arrangements, may be possible for a connection module as described in this disclosure. Although FIGS. 1-3 have been illustrated to identify a wired connection between the connection modules (e.g., first connection module 116 and second connection module 126) and the connection interfaces of the battery controller 140 (e.g., first connection interface 141 and second connection interface 142), it is also within the scope of this disclosure that the connection is made according to a wireless data transfer protocol. For example, a wireless data transfer protocol such as Bluetooth, Near Field Communication (NFC), Wi-Fi, Wireless LAN, or other known types of wireless data transfer protocols may be used to transmit signals between the connection modules and the connection interfaces.

Some of the pin locations of the first connection module 116 may correspond to a wire portion within the first connector 115 that connects with one or more battery cells within the battery pack 105. Similarly, some of the pin locations of the second connection module 126 may correspond to a wire portion within the second connector 125 that connects with one or more battery cells within the battery pack 105. The connection with the one or more battery cells within the battery pack 105 may allow the first connector 115 and second connector 125 to obtain information corresponding to an attribute of the one or more battery cells within the battery pack 105. According to some embodiments, the wire portion may be in connection with one or more battery cells that comprise the battery pack 105 through a sensor module such as a thermistor module in order to sense a temperature of the one or more battery cells, or a voltage module in order to sense a voltage of the one or more battery cells.

For example, FIG. 2 illustrates a number of first sensor modules 111 connected to battery cells from the first array 110 of battery cells. Each of the ten first sensor modules 111 may be configured to sense an attribute (e.g., temperature or voltage) of the battery cell from the first array 110 it is connected to. The sensed attribute of the battery cell may then be transmitted from the first sensor modules 111, through a wire portion of the first connector 115 as sensor information that is part of a battery sensor signal, and through the first connection module 116 via a pin location of the first connection module 116. FIG. 2 similarly illustrates a number of second sensor modules 121 connected to battery cells from the second array 120. Each of the ten second sensor modules 121 may be configured to sense an attribute (e.g., temperature or voltage) of the battery cell from the second array 120 it is connected to. The sensed attribute information of the battery cell may then be transmitted from the second sensor modules 121, through a wire portion of the second connector 125 as sensor information that is part of a battery sensor signal, and through the second connection module 126 via a pin location of the second connection module 126. It follows that the first connection module 116 may be comprised of a first number of active pins that are connected to a wire lead connected to a battery cell. Further, for purposes of identifying the battery cell type according to an aspect of this disclosure, the first connection module 116 may also include a second number of non-active pins that are not connected to a wire lead connected to a battery cell. Similarly, the second connection module 126 may be comprised of a first number of active pins that are connected to a wire lead connected to a battery cell, and a second number of non-active pins that are not connected to a wire lead connected to a battery cell.

The collection of sensor information provided through the pins of the first connection module 116 and second connection module 126 may be considered a first battery sensor signal and second battery sensor signal, respectively. In turn, the battery controller 140 may receive the first sensor signal via the first connection interface 141 when the first connection interface 141 is in communication with the first connection module 116. Further, the battery controller 140 may receive the second sensor signal via the second connection interface 142 when the second connection interface 142 is in communication with the second connection module 126.

Figure 4:
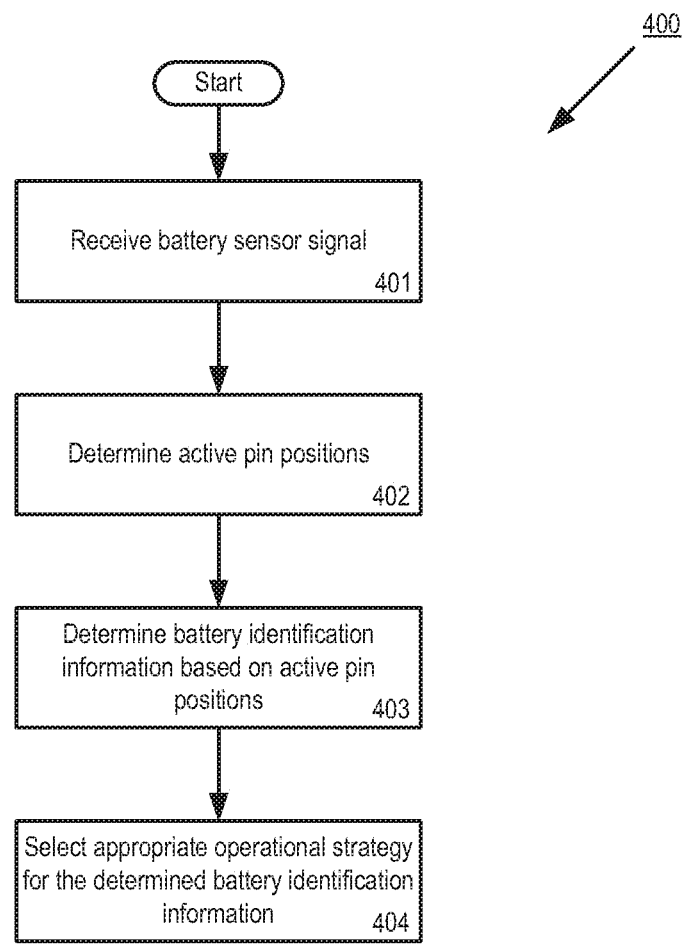
FIG. 4 illustrates a flow diagram describing an exemplary process for determining a battery cell type of a vehicle battery pack, according to some embodiments.

As described above, the battery controller 140 may analyze the received battery sensor signals and determine a battery cell type for the battery pack 105 based on the analysis. The analysis may, for example, be implemented according to the battery identification strategy being executed by the battery controller 140. FIG. 4 provides a more detailed description for an exemplary process for determining the battery cell type based on the analysis of one or more battery sensor signals by the battery controller 105.

FIG. 4 illustrates a flow chart 400 describing an exemplary process for determining a battery cell type based on a battery sensor signal received through a connection module comprised of a plurality of pin locations in a known arrangement. Further description of the flow chart 400 will be made with reference to the exemplary vehicle battery system 100 described in FIGS. 1 and 2. For example, the process may correspond to the battery identification strategy executed by the battery controller 140.

At 401, a battery sensor signal may be received by the battery controller 140 through a connection between a connection interface of the battery controller 140 and a connection module of a connector connected to one or more battery cells of the battery pack 105. The reception of the battery sensor signal may be in accordance to any one or more of the methods described herein.

At 402, the battery controller 140 may analyze the received battery sensor signal and determine which pin positions of the connection module are active in accordance to the battery identification strategy. In some embodiments, the battery controller 140 may further analyze the received battery sensor signal and determine which pin positions of the connection module are non-active in accordance to the battery identification strategy. It follows that at 402, the battery controller 140 may determine the pin positions within the connection module that are active pins and/or non-active pins.

At 403, the battery identification strategy may include determining battery identification information based on the active pin positions of the connection module determined at 402. For example, according to some embodiments, the battery identification information determined at 403 may correspond to a battery type (e.g., type of battery cells within the battery pack 105) identified based on the active pin positions and/or non-active pin positions of the connection module determined at 402.

It follows that the determination at 403 may be implemented by the battery controller 140 according to the battery identification strategy to determine a battery type in order to then select an appropriate operational strategy at 404 for operating the vehicle system and/or battery system to account for attributes of the determined battery type.

In addition or alternatively, according to some embodiments the battery identification information determined at 403 may correspond to a battery make, model, and/or manufacturer/supplier identified based on the active pin positions and/or non-active pin positions of the connection module determined at 402. According to such embodiments, the vehicle system may be configured to be compatible with a certain type of vehicle battery technology (e.g., the vehicle system may be configured to accept Lithium-ion types of batteries). It follows that the determination at 403 may be implemented according to the battery identification strategy to determine a battery make, model, and/or manufacturer/supplier of the certain type of vehicle battery in order to then select an appropriate operational strategy at 404 of the vehicle system and/or battery system to account for attributes of the specific battery based on the battery's make, model, and/or manufacturer/supplier.

Figure 5:
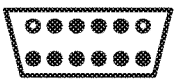
FIG. 5 illustrates an exemplary table that may be included in a database that identifies representative pin position arrangement information and the corresponding battery cell type, according to some embodiments.
Figure 5:
Figure 5:
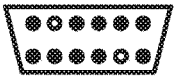

The battery controller 140 may further include a memory configured to store a database that includes information identifying specific arrangements of active and/or non-active pin positions for a known connection module having a set number of pin positions that correspond to specific types of battery cells. In addition or alternatively, according to some embodiments a database may be stored in the memory that includes information identifying specific arrangements of active and/or non-active pin positions for a known connection module having a set number of pin positions that correspond to specific makes, models, and/or manufacturer supplier of batteries. The database may be exemplified by a table such as table 500 illustrated in FIG. 5. Table 500 is presented to illustrate exemplary active and non-active pin position arrangements for a connection module having twelve pin positions. The solid dots represent active pin positions, as described herein, and the open dots represent non-active pin positions, as described herein. Each pin position arrangement entry in table 500 (e.g., as represented by the left-hand column) may include information that identifies a specific arrangement of active pin positions and/or non-active pin positions. Table 500 may further be configured such that each pin position arrangement entry may correspond to battery identification information. For example, according to some embodiments the battery identification information may identify a battery type. In addition or alternatively, according to some embodiments the battery identification information may identify a specific battery make, model, and/or manufacturer/supplier. In follows that table 500 allows the battery controller 140 executing the battery identification strategy to look-up battery identification information based on the identification of a specific pin position arrangement as determined from the analysis of the received battery sensor signal.

For instance, the pin position arrangement found in box 501 of table 500 may identify that such an arrangement of active and/or non-active pin positions corresponds to a Lithium-ion battery from Supplier A. Further, the pin position arrangement found in box 502 of table 500 may identify that such an arrangement of active and/or non-active pin positions corresponds to a Lithium-ion battery from Supplier B. Further, the pin position arrangement found in box 503 of table 500 may identify that such an arrangement of active and/or non-active pin positions corresponds to a Lithium-ion battery from Supplier B with increased capacity. It follows that the battery identification information provided in table 500 may identify a same type of battery from different suppliers (e.g., Supplier A and Supplier B), as well as different battery models from a same supplier (e.g., Lithium-ion battery from Supplier B and Lithium-ion battery with increased battery cell capacity from Supplier B), among other types of possible battery identification information as described herein.

The illustrated pin position arrangements and the corresponding battery identification information that the pin position arrangement represents in table 500 are provided for exemplary purposes only. It is within the scope of this disclosure for other available pin position arrangements to be used for representing the different battery identification information.

Further, although not specifically illustrated, it is within the scope of this disclosure for the battery identification information provided in table 500 to include information identifying different battery types, as described herein.

In addition, although table 500 is illustrated to provide exemplary pin position arrangements for identifying battery identification information for a twelve pin connection module, the database stored in the memory of the battery controller 140 may further include additional tables for connection modules having different numbers of pin positions and/or different pin position arrangements.

It should be noted that the table 500 may be pre-stored in the memory of the battery controller 140 before the corresponding vehicle is delivered to an automobile dealership or consumer. In addition or alternatively, the table 500 may be updated on the memory of the battery controller 140 after the corresponding vehicle is delivered to an automobile dealership or consumer. Further, in order to successfully implement the battery cell type recognition strategy described herein, the battery pack 105 should be manufactured such that the arrangement of connectors that are in communication with the actual battery cells of the battery pack 105 will result in an active and/or non-active pin position arrangement at the connecting module that correctly matches the identified pin position arrangement and battery cell type provided in the table 500.

It should also be noted that according to some embodiments, the number of non-active pin positions should be at least two less than a total number of total available pin positions on the connection module. For example, in the twelve pin position connection module described by table 500 in FIG. 5, it is provided that ten out of the twelve available pin positions are active pin positions while two out of the twelve available pin positions are non-active pin positions. This pin position arrangement strategy may be implemented according to some embodiments in order to at least reduce, or even prevent, the risk of redundancy issues that may arise when only one pin position is reserved for non-active status. In addition or alternatively, no single non-active pin position should be the same for identifying separate battery identification information in order to reduce, or even prevent, the risk of redundancy issues that may arise when a common non-active pin position is used for identifying different battery identification information within table 500.

Then at 404, the battery controller 140 executing the battery identification strategy may select an appropriate operational strategy for controlling the operation and use of the battery pack based on the battery identification information determined at 403. As described throughout this disclosure, battery packs may benefit from specialized operational controls specific to the attributes that may be unique based on the battery cell type, battery make, battery model, and/or battery manufacturer/supplier. Such specialized operational controls may allow the specific battery to be operated more efficiently and/or with increased durability than operational controls for other batteries.

By identifying the battery identification information at 403, the battery identification strategy of this disclosure may select the appropriate battery operational strategy at 404 that is intended to optimize the performance of a battery pack (e.g., battery pack 105) based on the attributes of the battery pack. According to some embodiments, the battery controller 140 executing the battery identification strategy may select the appropriate operational strategy from amongst a plurality of operational strategies stored within a memory of the battery controller 140. The selected appropriate operational strategy may then be run by the battery controller 140 to control an operation of the battery pack 105 and/or vehicle battery system 100.

The steps of the process described by flow chart 400 are provided for exemplary purposes, as it is within the scope of this disclosure for the battery controller 140 to execute the battery identification strategy to include a greater, or fewer, number of steps in order to achieve the features described herein.

Figure 6:
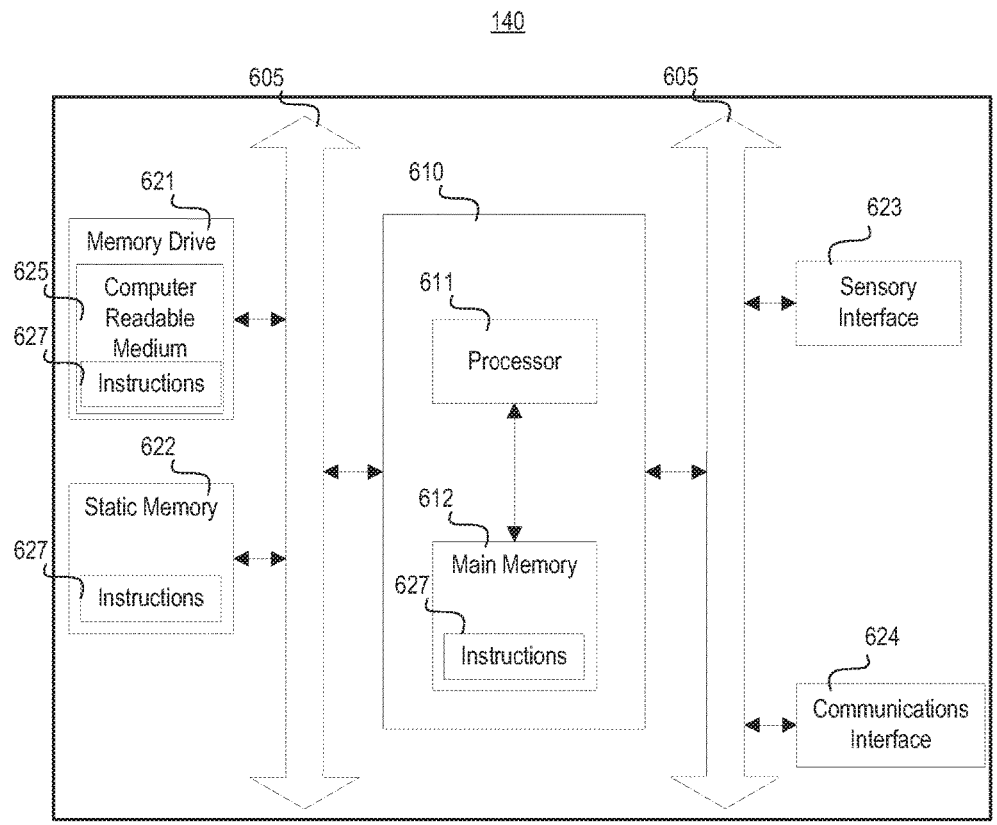
FIG. 6 illustrates an exemplary block diagram for a computing system that may be part of a vehicle battery system according to some embodiments.

Referring to FIG. 6, a more detailed illustration and description for the battery controller 140 is provided. The battery controller 140 may be a computing device that includes a processing unit 610 comprised of a processor 611 in communication with a main memory 612. The main memory 612 may store a set of instructions 627 that may be executed by the processor 611 to cause the battery controller 140 to perform any one or more of the methods, processes or computer-based functions disclosed herein. For example, the battery identification strategy described throughout this disclosure may be a program that is comprised of the set of instructions 627 that are executed by the processor 611 to perform any one or more of the methods, processes or computer-based functions described herein such as the processes for achieving the battery cell type recognition strategy described herein. The set of instructions 627 may also include instructions corresponding to software for implementing the operating procedures for controlling the operation of the battery pack described throughout this disclosure.

The battery controller 140 is part of the vehicle battery system as described herein, wherein the vehicle battery system is part of the overall vehicle system. It follows that the battery controller 140 may be in communication with other vehicle components such as a separate vehicle computing device configured to control, at least in part, the operation of the vehicle. The battery controller 140 may communicate with such other vehicle components via the communications interface 624. The communications interface 624 may support a wired or wireless connection. The battery controller 140 may further include a sensor interface 623 for communicating with one or more sensors that are part of the vehicle battery system. For example, the sensory interface 623 may be comprised of the first connection interface 141 and/or second connection interface 142 described herein.

As illustrated in FIG. 6, the processor 611 may be representative of one or more processing units. Moreover, the battery controller 140 can include the main memory 612 and a static memory 622 that can communicate with each other via a bus 605 (although not specifically illustrated, dynamic memory may also be included in addition to, or in replace of, the static memory 622). In addition to storing the instructions 627, the main memory 612 may be additionally tasked with storing the database including one or more tables (e.g., table 500) that identify pin position arrangements and their representative battery identification information as described herein.

The battery controller 140 can also include a memory drive unit 621 for receiving a computer readable medium 628. In a particular embodiment, the memory drive unit 621 may receive the computer-readable medium 625 in which one or more sets of instructions 627, such as the software corresponding to the battery identification strategy, can be embedded. The computer readable medium 625 may be any electronic based memory storage medium, magnetic based memory storage medium, optical based memory storage medium, or other known type of memory storage medium. In a particular embodiment, the instructions 627 may reside completely, or at least partially, within any one or more of the main memory 612, the static memory 622, computer readable medium 625, and/or within the processor 611 during execution of the instructions 627 by the processor 611.

In accordance with various embodiments of the present disclosure, the methods described herein may be implemented by software programs executable by the battery controller 140. Further, in an exemplary, non-limited embodiment, implementations can include distributed processing, component/object distributed processing, and parallel processing. Alternatively, virtual computer system processing can be constructed to implement one or more of the methods or functionality as described herein.

Any process descriptions or blocks in the figures, should be understood as representing modules, segments, or portions of code which include one or more executable instructions for implementing specific logical functions or steps in the process, and alternate implementations are included within the scope of the embodiments described herein, in which functions may be executed out of order from that shown or discussed, including substantially concurrently or in reverse order, depending on the functionality involved, as would be understood by those having ordinary skill in the art.

It should be emphasized that the above-described embodiments, particularly, any "preferred" embodiments, are possible examples of implementations, merely set forth for a clear understanding of the principles of the invention. Many variations and modifications may be made to the above-described embodiment(s) without substantially departing from the spirit and principles of the techniques described herein. All such modifications are intended to be included herein within the scope of this disclosure and protected by the following claims.

What is claimed is:

1. A vehicle comprising:
   (i) a battery pack comprising:
      battery cells;
      battery cell sensors, each of the battery cell sensors corresponding to and in communication with one of the battery cells, to:
         measure attributes of each of the battery cells; and
         generate battery cell sensor signals for each of the battery cells based on the measured attributes;
      connecting wires, each connecting wire being in communication with (a) one or more of the battery cells, or (b) one or more of the battery cell sensors to transmit the battery cell sensor signals; and
      a connection module comprising a plurality of active connection module pins, each of the active connection module pins being in electrical communication with at least one of the plurality of connecting wires;
   (ii) a port configured to interface with the connection module, the port comprising a plurality of port pins configured to respectively engage with the plurality of active connection module pins and thereby receive the battery cell sensor signals from the connecting wires via the port pins; and
   (iii) processor(s) configured to:
      receive the battery cell sensor signals via the port pins;
      determine an arrangement of the active connection module pins based on the battery cell sensor signals;
      load a database that relates arrangements of active connection module pins to battery pack identification information;
      determine, by looking up the determined arrangement of the active connection module pins in the database, identification information corresponding to the battery pack;
      select an operational strategy for the vehicle based on the determined identification information of the battery pack; and
      implement the selected operational strategy on the vehicle.

2. The vehicle of claim 1, wherein a total number of the port pins exceeds a total number of the active connection module pins such that when the port interfaces with the connection module, at least one of the port pins fails to engage with any of the active connection module pins.

3. The vehicle of claim 2, wherein the processor(s) are configured to: determine the arrangement of active connection module pins based on determining a location of the at least one of the port pins that has failed to engage with any of the active connection module pins.

4. The vehicle of claim 1, wherein the loaded database comprises a plurality of entries, each entry relating one possible arrangement of active connection module pins to one set of battery pack identification information.

5. The vehicle of claim 4, wherein the set of battery pack identification information of each entry includes at least one of a battery type, a battery make, a battery model, and a battery manufacturer.

6. The vehicle of claim 4, wherein each entry relates one possible arrangement of (a) active connection module pins and (b) missing or inactive connection module pins to one set of possible attributes of the battery pack.

7. The vehicle of claim 6, wherein, for each entry:
   a sum of (a) a total number of active connection module pins and (b) a total number of missing or inactive connection module pins equals a total number of the plurality of port pins; and
   the total number of missing or inactive connection module pins is at least one.

8. The vehicle of claim 7, wherein the sum is the same for each entry.

9. The vehicle of claim 1, wherein the database is loaded from a plurality of databases.

10. The vehicle of claim 2, wherein the total number of port pins exceeds the total number of the active connection module pins by at least two.

11. The vehicle of claim 1, wherein the processor(s) are configured to determine the identification information of the battery pack without reference to content of the battery cell sensor signals.

12. A method of controlling a vehicle, the vehicle comprising:
   (i) a battery pack comprising:
      battery cells;
      battery cell sensors, each of the battery cell sensors corresponding to and in communication with one of the battery cells, to:
         measure attributes of each of the battery cells; and
         generate battery cell sensor signals for each of the battery cells based on the measured attributes;
      connecting wires, each connecting wire being in communication with (a) one or more of the battery cells, or (b) one or more of the battery cell sensors to transmit the battery cell sensor signals; and
      a connection module comprising a plurality of active connection module pins, each of the active connection module pins being in electrical communication with at least one of the plurality of connecting wires;
   (ii) a port configured to interface with the connection module, the port comprising a plurality of port pins configured to engage with the plurality of active connection module pins and thereby receive the battery cell sensor signals from the connecting wires via the port pins; and
   (iii) processor(s);
   wherein the method comprises, via the processor(s):
      receiving the battery cell sensor signals via the port pins;
      determining an arrangement of the active connection module pins based on the battery cell sensor signals;
      loading a database that relates arrangements of active connection module pins to battery pack identification information;
      determining, by looking up the determined arrangement of the active connection module pins in the database, identification information corresponding to the battery pack;
      selecting an operational strategy for the vehicle based on the determined one or more actual attributes of the battery pack; and
      implementing the selected operational strategy on the vehicle.

13. The method of claim 12, wherein a total number of the port pins exceeds a total number of the active connection module pins such that when the port interfaces with the connection module, at least one of the port pins fails to engage with any of the active connection module pins; and
wherein the method comprises determining the arrangement of active connection module pins based on determining a location of the at least one of the port pins that has failed to engage with any of the active connection module pins.

14. The method of claim 12, comprising determining the identification information of the battery pack without reference to content of the battery cell sensor signals.

15. The method of claim 12, wherein the loaded database comprises a plurality of entries, each entry relating one possible arrangement of active connection module pins to one set of battery pack identification information.

16. The method of claim 15, wherein each entry relates one possible arrangement of (a) active connection module pins and (b) missing or inactive connection module pins to one set of battery pack identification information.

17. The method of claim 16, wherein, for each entry, a sum of (a) a total number of active connection module pins and (b) a total number of missing or inactive connection module pins equals a total number of the plurality of port pins;
the total number of missing or inactive connection module pins is at least one; and
the sum is the same for each entry.

18. The method of claim 13, wherein the database is loaded from a plurality of databases; and
the total number of port pins exceeds the total number of the active connection module pins by at least two.

19. The vehicle of claim 1, wherein the measured attributes include at least one of a temperature or a voltage.

20. The vehicle of claim 1, wherein, to implement the selected operational strategy, the processor is configured to control the battery pack in response to the measured attributes according to the selected operational strategy.

21. The method of claim 12, wherein the measured attributes include at least one of a temperature or a voltage.

22. The method of claim 12, wherein implementing the selected operational strategy on the vehicle includes controlling the battery pack in response to the measured attributes according to the selected operational strategy.

* * * * *